(12) United States Patent
Hanan

(10) Patent No.: US 11,738,902 B2
(45) Date of Patent: Aug. 29, 2023

(54) CONTAINER PREFORM WITH STEPPED INTERIOR FINISH

(71) Applicant: Niagara Bottling, LLC, Diamond Bar, CA (US)

(72) Inventor: Jay Clarke Hanan, Diamond Bar, CA (US)

(73) Assignee: Niagara Bottling, LLC, Diamond Bar, CA (US)

(*) Notice: Subject to any disclaimer, the term of this patent is extended or adjusted under 35 U.S.C. 154(b) by 318 days.

(21) Appl. No.: 16/986,825

(22) Filed: Aug. 6, 2020

(65) Prior Publication Data

US 2021/0039824 A1 Feb. 11, 2021

Related U.S. Application Data

(60) Provisional application No. 62/884,566, filed on Aug. 8, 2019.

(51) Int. Cl.
*B65D 1/02* (2006.01)
*B29B 11/08* (2006.01)
*B29K 67/00* (2006.01)

(52) U.S. Cl.
CPC .......... *B65D 1/0246* (2013.01); *B29B 11/08* (2013.01); *B29C 2949/0731* (2022.05);
(Continued)

(58) Field of Classification Search
CPC ....... B29B 11/14; B29B 11/08; B65D 1/0246; B65D 1/0223; B29K 2995/0073;
(Continued)

(56) References Cited

U.S. PATENT DOCUMENTS 4,927,680 A 5/1990 Collette et al.
5,011,648 A 3/1991 Garver et al.
(Continued)

FOREIGN PATENT DOCUMENTS

WO 2015/032897 A1 3/2015
WO WO2015032897 A1 3/2015
WO WO2017136584 A1 8/2017

OTHER PUBLICATIONS

International Search Report with Written Opinion for related Application No. PCT/US2020/45349 dated Nov. 19, 2020 (8 Pages).

*Primary Examiner* — Monica A Huson
(74) *Attorney, Agent, or Firm* — Michael Best & Friedrich LLP

(57) ABSTRACT

A preform is provided for blow-molding to form a container. The preform includes a finish portion for rotatably engaging a closure to seal pressurized contents within an interior of the container. The finish portion comprises a cylindrical body that begins at an opening to the interior and extends to and includes a tamper evidence ledge. A bevel at a beginning of the opening receives a plug seal of the closure. Multiple mirror polished surfaces beyond the bevel are configured to cooperate with the plug seal to seal the container. Mirror polished transition surfaces are disposed between diameter changes within the finish portion. In some embodiments, wherein the plug seal includes a sidewall profile that mates with the transition surfaces, an interior surface of the preform has a diameter that tightly compresses an end of the plug seal to contain pressurized contents within the container.

22 Claims, 4 Drawing Sheets

(52) U.S. Cl.
CPC .......... *B29C 2949/0773* (2022.05); *B29C 2949/0777* (2022.05); *B29C 2949/20* (2022.05); *B29K 2067/003* (2013.01); *B29K 2995/0018* (2013.01)

(58) Field of Classification Search
CPC ...... B29K 2067/003; B29K 2995/0022; B29K 2995/0018; B29C 2949/0731; B29C 2949/24; B29C 2949/26; B29C 2949/22; B29C 49/06; B29C 2949/28; B29C 2949/0769; B29C 2949/0733; B29C 2949/0773; B29C 2949/20; B29C 2949/0777; B29L 2031/7158
See application file for complete search history.

(56) References Cited

U.S. PATENT DOCUMENTS

| | | | |
|---|---|---|---|
| 5,097,974 A | 3/1992 | Rozenberg | |
| 5,213,225 A | 5/1993 | King et al. | |
| 5,756,172 A | 5/1998 | Semersky | |
| 5,804,016 A | 9/1998 | Schmidt et al. | |
| 5,888,598 A | 3/1999 | Brewster et al. | |
| 6,260,723 B1 | 7/2001 | Bergholz | |
| 7,637,384 B2 | 12/2009 | Price et al. | |
| 8,308,002 B2 | 11/2012 | Penny | |
| 8,815,356 B2 | 8/2014 | Huettner | |
| 8,827,688 B2 | 9/2014 | Maki et al. | |
| 9,033,168 B2 | 5/2015 | Darr et al. | |
| 9,233,771 B2 | 1/2016 | Siegl | |
| 2008/0050546 A1 | 2/2008 | Kitano et al. | |
| 2008/0053949 A1 | 3/2008 | Farrar et al. | |
| 2008/0116162 A1 | 5/2008 | Penny | |
| 2008/0257855 A1 | 10/2008 | Patel | |
| 2010/0314348 A1 | 12/2010 | Zoppas et al. | |
| 2012/0091134 A1 | 4/2012 | Sadiq et al. | |
| 2012/0263902 A1 | 10/2012 | Hanan | |
| 2014/0076838 A1 | 3/2014 | Siegl | |
| 2015/0375887 A1 | 12/2015 | Van Dijck et al. | |
| 2016/0137331 A1 | 5/2016 | Hanan | |
| 2016/0193750 A1 | 7/2016 | Gaiotti et al. | |
| 2017/0217646 A1 | 8/2017 | Hanan | |
| 2018/0043603 A1 | 2/2018 | Smith et al. | |
| 2018/0229881 A1 | 8/2018 | Jarman et al. | |
| 2018/0297752 A1 | 10/2018 | Mai | |
| 2018/0327131 A1 | 11/2018 | Hanan | |
| 2019/0367203 A1 | 12/2019 | Okuyama et al. | |
| 2020/0031530 A1 | 1/2020 | Hanan | |
| 2020/0031531 A1 | 1/2020 | Hanan | |
| 2020/0095007 A1 | 3/2020 | Jarman et al. | |
| 2020/0269484 A1 | 8/2020 | Hanan | |
| 2020/0298461 A1 | 9/2020 | Hanan et al. | |
| 2020/0298462 A1 | 9/2020 | Hanan | |
| 2021/0039823 A1 | 2/2021 | Hanan | |
| 2021/0039824 A1 | 2/2021 | Hanan | |
| 2021/0101707 A1 | 4/2021 | Hanan | |

CONTAINER PREFORM WITH STEPPED INTERIOR FINISH

PRIORITY

This application claims the benefit of and priority to U.S. Provisional Application, entitled "Container Preform With Stepped Interior Finish," filed on Aug. 8, 2019 and having application Ser. No. 62/884,566, the entirety of said application being incorporated herein by reference.

FIELD

Embodiments of the present disclosure generally relate to the field of plastic bottles and preforms. More specifically, embodiments of the disclosure relate to a preform that includes a stepped interior surface and is configured for being blow-molded to form a container to store pressurized contents.

BACKGROUND

Plastic containers have been used as a replacement for glass or metal containers in the packaging of beverages for several decades. The most common plastic used in making beverage containers today is polyethylene terephthalate (PET). Containers made of PET are transparent, thin walled, and have the ability to maintain their shape by withstanding the force exerted on the walls of the container by their contents. PET resins are also reasonably priced and easy to process. PET bottles are generally made by a process that includes the blow-molding of plastic preforms which have been made by injection molding of the PET resin.

Advantages of plastic packaging include lighter weight and decreased breakage as compared to glass, and lower costs overall when taking both production and transportation into account. Although plastic packaging is lighter in weight than glass, there is still great interest in creating the lightest possible plastic packaging so as to maximize the cost savings in both transportation and manufacturing by making and using containers that contain less plastic.

A plastic container for storing liquid contents typically includes a base that extends up to a grip portion suitable for affixing a label, as well as providing a location for grasping the container. The grip portion generally transitions into a shoulder, which connects to a bell. The bell has a diameter that generally decreases as the bell extends upward from the shoulder to a neck and a finish. The finish is adapted to receive a closure, such as a bottle cap, to seal the contents within the interior of the plastic container.

In many instances, the closure includes a tamper evidence band that is disposed around the perimeter of the finish. The tamper evidence band generally remains positioned on the finish when an end-user loosens the closure to access the contents within the container. As such, the tamper evidence band and the finish cooperate to indicate to the end-user whether or not the closure has been previously loosened after being installed by the manufacturer.

Advantages of plastic containers include lighter weight and decreased breakage as compared to glass, and lower costs overall when taking both production and transportation into account. As such, there is a continuous interest in creating the lightest possible plastic container so as to maximize cost savings in both transportation and manufacturing by making and using containers that contain less plastic. Embodiments disclosed herein provide articles, including preforms and containers, that utilize less plastic in their construction while maintaining the ease of processing and excellent structural properties associated with current commercial designs.

SUMMARY

A preform is provided for blow-molding to form a container. The preform includes a finish portion for rotatably engaging a closure to seal pressurized contents within an interior of the container. The finish portion comprises a cylindrical body that begins at an opening to the interior and extends to and includes a tamper evidence ledge. A bevel at a beginning of the opening is configured to receive a plug seal of the closure. Multiple mirror polished surfaces beyond the bevel are configured to cooperate with the plug seal to seal the container. Mirror polished transition surfaces are disposed between diameter changes within the finish portion. The mirror polished surfaces may be formed by way of any of various suitable polishing techniques, such as mechanical machining and buffing, chemical treatments and coating, plasma treatments, and the like. In some embodiments, the plug seal may include a sidewall profile configured to mate with the transition surfaces. In such embodiments, an interior surface of the preform includes a diameter that tightly compresses an end of the plug seal to contain pressurized contents within the container.

In an exemplary embodiment, a finish portion of a preform for rotatably engaging with a closure to seal pressurized contents within an interior of a container formed from the preform comprises: a cylindrical body that begins at an opening to the interior and extends to and includes a tamper evidence ledge; a bevel disposed at a beginning of the opening and configured to receive a plug seal of the closure; and a stepped interior comprising a graduated narrowing of the opening and extending from the bevel through the cylindrical body.

In another exemplary embodiment, the stepped interior is configured to minimize the quantity of resin comprising the finish portion. In another exemplary embodiment, the stepped interior is configured to compressibly receive a plug seal comprising graduated seals configured to tightly engage with the graduated narrowing. In another exemplary embodiment, the graduated seals include one or more diameters suitable for engaging with the graduated narrowing of the opening so as to seal pressurized contents within the container.

In another exemplary embodiment, the stepped interior includes one or more sealing surfaces configured to tightly engage with one or more seals comprising the plug seal to form a tight seal between the closure and the container suitable for storing pressurized contents, such as carbonated beverages, within the container. In another exemplary embodiment, the one or more sealing surfaces each comprises a mirror-polished surface formed by way of any of various suitable polishing techniques. In another exemplary embodiment, adjacent of the one or more sealing surfaces are joined by a transition surface. In another exemplary embodiment, the transition surface includes a mirror-polished surface formed by way of any of various suitable polishing techniques. In another exemplary embodiment, the transition surface is configured to cooperate with the one or more seals of the plug seal so as to contribute to forming the tight seal between the closure and the container.

In another exemplary embodiment, the stepped interior includes a sealing surface adjacent to the bevel and configured to cooperate with the plug seal to seal the contents with the container. In another exemplary embodiment, the stepped interior includes a transition surface extending from the sealing surface to a handling surface and a secondary transition surface extending from the handling surface to an interior surface of the cylindrical body. In another exemplary embodiment, the sealing surface is configured to compressibly receive a first seal comprising the plug seal. In another exemplary embodiment, the handling surface is configured to compressibly receive a second seal comprising the plug seal. In another exemplary embodiment, the interior surface is configured to compressibly receive a third seal comprising the plug seal. In another exemplary embodiment, the sealing surface includes a first diameter configured to tightly compress a first seal of the plug seal. In another exemplary embodiment, the handling surface includes a second diameter configured to tightly compress a second seal of the plug seal, the second diameter being equal to or less than the first diameter. In another exemplary embodiment, the interior surface includes a third diameter configured to tightly compress a third seal of the plug seal, the third diameter being equal to or less than the second diameter.

In an exemplary embodiment, a finish portion of a preform for rotatably engaging with a closure to seal pressurized contents within an interior of a container formed from the preform comprises: a cylindrical body that begins at an opening to the interior and extends to and includes a tamper evidence ledge; a bevel is disposed at a beginning of the opening and configured to receive a plug seal of the closure; and a stepped interior comprising a graduated narrowing extending from the opening through the cylindrical body.

In another exemplary embodiment, the stepped interior is configured to minimize the quantity of resin comprising the finish portion. In another exemplary embodiment, the stepped interior is configured to compressibly receive a plug seal comprising graduated seals configured to tightly engage with the graduated narrowing. In another exemplary embodiment, the graduated seals include one or more diameters suitable for engaging with the graduated narrowing of the opening so as to seal pressurized contents within the container.

In another exemplary embodiment, the stepped interior includes one or more sealing surfaces configured to tightly engage with one or more seals comprising the plug seal to form a tight seal between the closure and the container suitable for storing pressurized contents, such as carbonated beverages, within the container. In another exemplary embodiment, the one or more sealing surfaces each comprises a mirror-polished surface formed by way of any of various suitable polishing techniques. In another exemplary embodiment, adjacent of the one or more sealing surfaces are joined by a transition surface comprising a mirror-polished surface configured to cooperate with the one or more seals of the plug seal so as to contribute to forming the tight seal between the closure and the container.

In another exemplary embodiment, the stepped interior includes a sealing surface adjacent to the bevel and configured to cooperate with the plug seal to seal the contents with the container. In another exemplary embodiment, the stepped interior includes a transition surface extending from the sealing surface to a handling surface and a secondary transition surface extending from the handling surface to an interior surface of the preform. In another exemplary embodiment, the sealing surface is configured to compressibly receive a first seal comprising the plug seal. In another exemplary embodiment, the handling surface is configured to compressibly receive a second seal comprising the plug seal. In another exemplary embodiment, the interior surface is configured to compressibly receive a third seal comprising the plug seal. In another exemplary embodiment, the sealing surface includes a first diameter configured to tightly compress a first seal of the plug seal. In another exemplary embodiment, the handling surface includes a second diameter configured to tightly compress a second seal of the plug seal, the second diameter being equal to or less than the first diameter. In another exemplary embodiment, the interior surface includes a third diameter configured to tightly compress a third seal of the plug seal, the third diameter being equal to or less than the second diameter.

In an exemplary embodiment, a finish portion of a preform for rotatably engaging with a closure to seal pressurized contents within an interior of a container formed from the preform comprises: a cylindrical body that begins at an opening to the interior and extends to and includes a tamper evidence ledge; a sealing surface adjacent to the opening for cooperating with a plug seal of the closure to seal the contents with the container; a transition surface extending from the sealing surface to a handling surface for receiving equipment to form the preform into the container; and a secondary transition surface extending from the handling surface to an interior surface of the preform.

In another exemplary embodiment, the sealing surface comprises a mirror-polished surface disposed along the interior of the finish portion for cooperating with the plug seal to retain contents within the container. In another exemplary embodiment, the transition surface comprises a mirror-polished surface configured to cooperate with the plug seal to form a tight seal between the closure and the container. In another exemplary embodiment, the handling surface includes a mirror-polished surface similar to either or both of the sealing surface and the transition surface.

In another exemplary embodiment, the secondary transition surface comprises a narrowing of an interior diameter of the handling surface to a smaller diameter of the interior surface. In another exemplary embodiment, the secondary transition surface comprises a mirror-polished surface to cooperate with the plug seal of the closure to form a tight seal suitable for storing pressurized contents. In another exemplary embodiment, the interior surface comprises a mirror-polished surface having a diameter adapted to tightly compress an end of the plug seal to seal pressurized contents within the container.

BRIEF DESCRIPTION OF THE DRAWINGS

The drawings refer to embodiments of the present disclosure in which.

Figure 1:
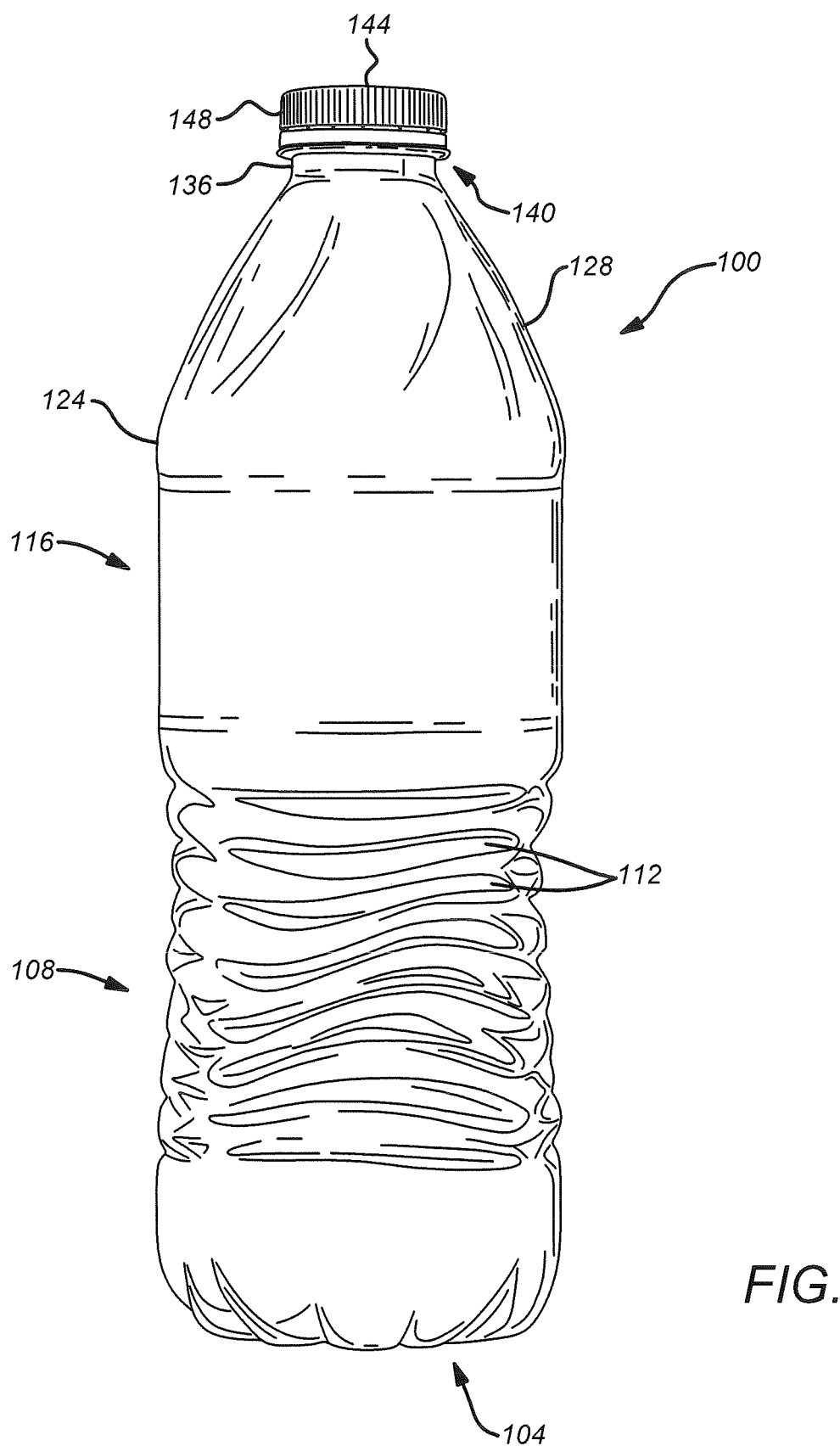
FIG. 1 illustrates a side view of an exemplary container suitable for storing pressurized contents.

While the present disclosure is subject to various modifications and alternative forms, specific embodiments thereof have been shown by way of example in the drawings and will herein be described in detail. The invention should be understood to not be limited to the particular forms disclosed, but on the contrary, the intention is to cover all modifications, equivalents, and alternatives falling within the spirit and scope of the present disclosure.

DETAILED DESCRIPTION

In the following description, numerous specific details are set forth in order to provide a thorough understanding of the present disclosure. It will be apparent, however, to one of ordinary skill in the art that the invention disclosed herein may be practiced without these specific details. In other instances, specific numeric references such as "first bottle," may be made. However, the specific numeric reference should not be interpreted as a literal sequential order but rather interpreted that the "first bottle" is different than a "second bottle." Thus, the specific details set forth are merely exemplary. The specific details may be varied from and still be contemplated to be within the spirit and scope of the present disclosure. The term "coupled" is defined as meaning connected either directly to the component or indirectly to the component through another component. Further, as used herein, the terms "about," "approximately," or "substantially" for any numerical values or ranges indicate a suitable dimensional tolerance that allows the part or collection of components to function for its intended purpose as described herein.

In general, there is a continuous interest in creating the lightest possible plastic container so as to maximize cost savings in both transportation and manufacturing by making and using containers that contain less plastic. Embodiments disclosed herein provide articles, including preforms and containers, that utilize less plastic in their construction while maintaining an ease of processing and excellent structural properties associated with current commercial designs.

FIG. 1 illustrates a side view of an exemplary container 100 typically used for storing liquid contents, such as water, juice, and particularly carbonated contents. The container 100 comprises a base 104 that extends up to a grip portion 108. In some embodiments, the base 104 may be of the petaloid variety, although other configurations of the base may be incorporated into the container 100, without limitation. The grip portion 108 comprises a plurality of grip portion ribs 112 (i.e., sidewall ribs). As illustrated in FIG. 1, the plurality of grip portion ribs 112 generally vary in depth, and swirl or angulate around the grip portion 108. A label portion 116 is connected to the grip portion 108 and comprises one or more label panel ribs (not shown). The label panel portion 116 transitions into a shoulder 124, which connects to a bell 128.

In the embodiment illustrated in FIG. 1, the bell 128 comprises a plurality of design features 132. In other embodiments, however, the bell 128 may include various other design features, or may be smooth and generally unornamented. The bell 128 connects to a neck 136, which connects to a finish 140. As shown in FIG. 1, the bell 128 comprises a diameter that generally decreases as the bell 128 extends upward from the shoulder 124 to the neck 136 and the finish 140. The finish 140 is adapted to receive a closure, such as by way of non-limiting example, a container cap or closure 144, so as to seal contents within the container 100. The finish 140 generally defines an opening that leads to an interior of the container 100 for containing a beverage, or other contents, such as any of a variety of carbonated soft drinks. The finish 140 may be of the Carbonated Soft Drink (CSD) variety, or may be configured to receive closures suitable for sealing noncarbonated contents within the interior of the container 100.

Figure 3:
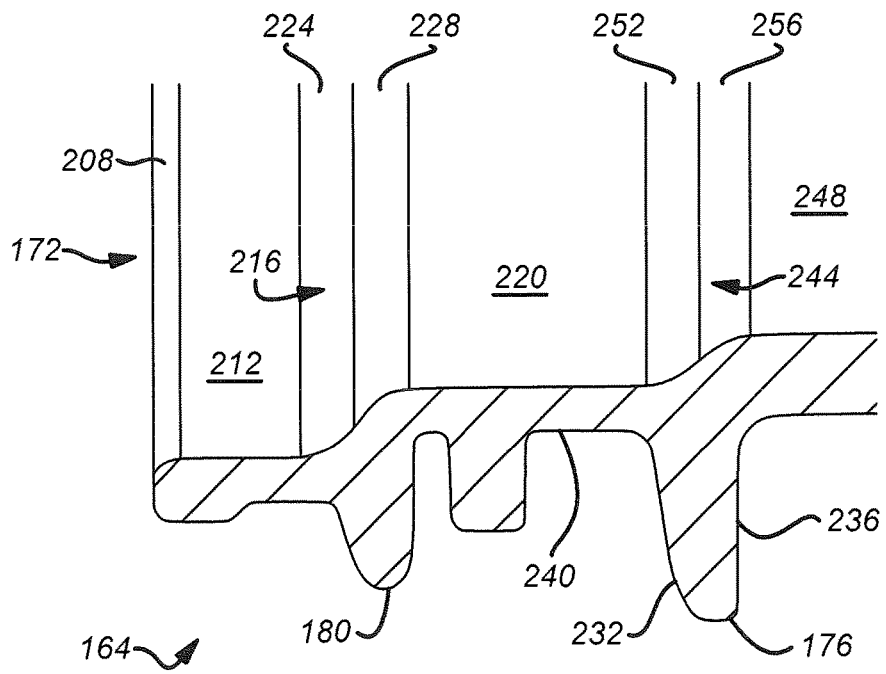
FIG. 3 illustrates a close-up cross-sectional view of a sidewall portion of a finish comprising the preform illustrated in FIG. 2, according to the present disclosure.

As shown in FIG. 1, a tamper evidence closure 144 may be threadably engaged with the finish 140 of FIG. 3. The closure 144 generally includes interior threads that are configured to engage with threads disposed on the finish 140, as described herein. During tightening of the closure 144 onto the finish 140, a plug seal of the closure 144 extends into the opening of the container 100 and enters into a pressed relationship with the finish 140 whereby contents may be sealed in the interior of the container 100.

As further shown in FIG. 1, the closure 144 includes a tamper evidence band 148 to provide an indication of whether or not the closure 144 has been loosened after being installed by a manufacturer. In some embodiments, the tamper evidence band 148 may be attached to the closure 144 by a multiplicity of thin connections. The tamper evidence band 148 may include a cam that is configured to fixedly engage with a tamper evidence ledge disposed on the finished 140 during loosening of the closure 144. Once the closure 144 is installed onto the finish 140 by a manufacturer and later an end-user loosens the closure 144, the cam engages the tamper evidence ledge, breaking the thin connections between tamper evidence band 148 and the closure 144. The tamper evidence band 148 remains positioned on the tamper evidence ledge after the closure 144 is removed from the container 100. As such, the tamper evidence band 148 cooperates with the tamper evidence ledge to indicate to the end-user whether or not the closure 144 has been previously loosened after being installed by the manufacturer.

Figure 2:
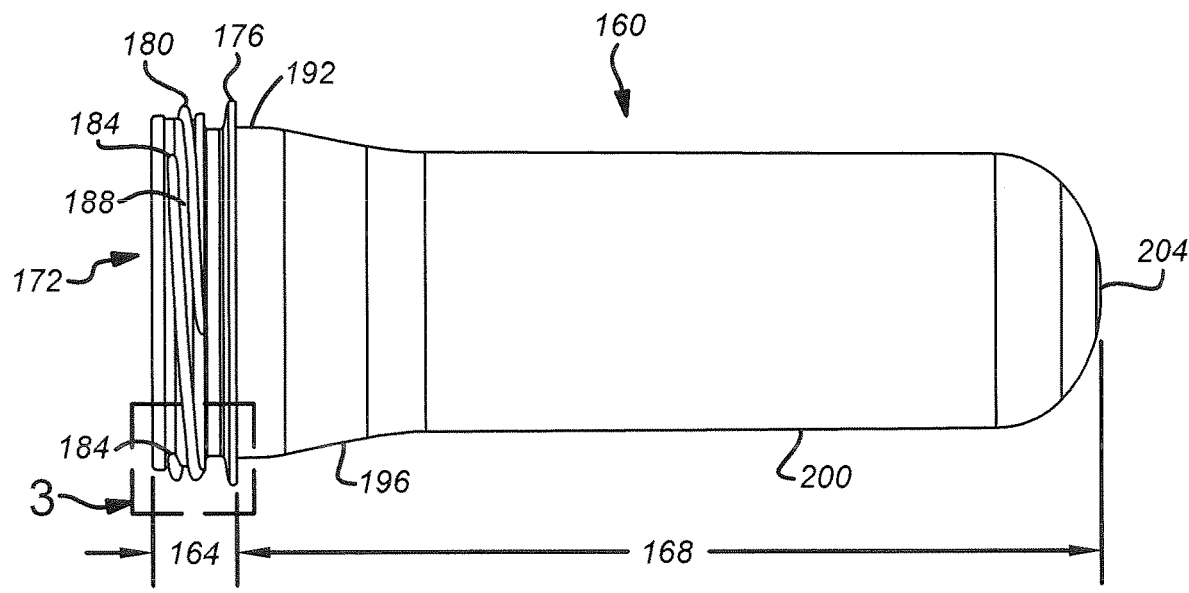
FIG. 2 a side plan view of an exemplary embodiment of a preform suitable for being blow-molded to form a container in accordance with the present disclosure.

FIG. 2 illustrates an exemplary embodiment of a preform 160 suitable for being blow-molded to form a plastic bottle, such as the container 100, according to the present disclosure. The preform 160 preferably is made of material approved for contact with food and beverages such as virgin PET or recycled PET and can be of any of a wide variety of shapes and sizes. The preform 160 shown in FIG. 2 is of the type which will form a 12-16 oz. beverage bottle, but as will be understood by those skilled in the art, other preform configurations may be used depending upon the desired configuration, characteristics and use of the final article. The preform 160 may be made by injection molding methods, without limitation.

The preform 160 includes a finish portion 164 and a body portion 168, formed monolithically (i.e., as a single, or unitary, structure). Advantageously, the monolithic arrangement of the preform 160, when blow-molded into a bottle, provides greater dimensional stability and improved physical properties in comparison to a preform constructed of separate neck and body portions that are bonded together.

The finish portion 164 begins at an opening 172 to an interior of the preform 160 and extends to and includes a tamper evidence ledge 176. The finish portion 164 is further characterized by the presence of one or more threads 180 configured to provide a means to fasten a closure, such as a cap, to the bottle produced from the preform 160. As such, the threads 180 are configured to rotatably engage with similar threads disposed within the cap to provide a way to seal contents within the bottle. In the embodiment illustrated in FIG. 2, each of the threads 180 generally extends along a section of the circumference of the finish portion 164 and approaches the tamper evidence ledge 176. Thus, when the threads of a cap are engaged with the threads 180, and the cap is rotated in a clockwise direction, the cap advances toward the tamper evidence ledge 176.

With continuing reference to FIG. 2, each of the one or more threads 180 begins at a thread start 184 and extends along an angular section of the finish portion 164. The thread start 184 is configured to guide the thread 180 into a space, or valley, between adjacent threads of the cap so as to threadably engage the cap with the finish portion 164. Further, the threads 180 generally are disposed adjacently to one another, separated by a valley 188, and are spaced uniformly around the circumference of the finish portion 164. In some embodiments, wherein three threads 180 are disposed around the finish portion 164, the thread starts 184 of adjacent threads 180 are spaced at substantially 120-degree intervals around the perimeter of the finish portion 164. As will be appreciated, however, more or less than three threads 180 may be incorporated into the finish portion 164 without deviating beyond the scope of the present disclosure.

In some embodiments, a plurality of gaps may be disposed in the threads 180 and positioned uniformly around the perimeter of the finish portion 164. Preferably, the gaps of adjacent threads 180 are vertically aligned so as to form channels extending longitudinally along the finish portion 164. The channels advantageously operate to relieve pressure within the container 100 when the container 144 is loosened. As will be appreciated, the channels may provide a direct route for gases escaping the interior of the container 100, rather than the gases being forced to travel around the finish portion 164 between adjacent threads 180.

The body portion 168 includes a neck portion 192 that extends to a tapered portion 196 of the body portion 168. The tapered portion 196 comprises a smooth transition from a diameter of the neck portion 192 to a relatively smaller diameter of a cylindrical portion 200 of the preform 160. The cylindrical portion 200 is a generally elongate member that culminates in an end cap 204. In some embodiments the body portion 168 may be generally cylindrical, and the end cap 204 may be conical or frustoconical and may also be hemispherical, and the very terminus of the end cap 204 may be flattened or rounded.

In some embodiments, a wall thickness of the cylindrical portion 200 may be substantially uniform throughout the cylindrical portion 200 and the end cap 204. A wall thickness of the tapered portion 196, however, generally decreases from the wall thickness of the cylindrical portion 200 to a relatively thinner wall thickness of the neck portion 192. As will be appreciated, the wall thickness of the cylindrical portion 200 is relatively greater than the wall thickness of the neck portion 192 so as to provide a wall thickness at the desired dimensions of a finished product after the preform 160 is blow-molded into the shape and size of a bottle. As such, the wall thickness throughout most of the body portion 168 will depend upon the overall size of the preform 160 and the wall thickness and overall size of the resulting container.

FIG. 3 illustrates a close-up cross-sectional view of a sidewall of the finish portion 164 illustrated in FIG. 2. As will be appreciated, the finish 164 comprises a cylindrical body that begins at the opening 172 to the interior of the container 100 and extends to and includes the tamper evidence ledge 176. The finish portion 164 includes a bevel 208 disposed at the beginning of the opening 172. The bevel 208 is configured to enter into sliding contact with a plug seal of the closure 144 so as to prevent contents from leaking out of the container 100 formed from the preform 160. In some embodiments, the bevel 208 operates to guide the plug seal onto a sealing surface 212 disposed on an interior of the finish portion 164. In general, the bevel 208 and the sealing surface 212 comprise portions of the interior of the finish portion 164 that extend circumferentially around the opening 172.

As will be appreciated, the sealing surface 212 must comprise a sufficiently smooth surface capable of cooperating with the plug seal to retain contents under pressure, such as carbonated contents, within the container 100. To this end, it is contemplated that the sealing surface 212 may be highly polished so as to be substantially free of surface defects and thus conditioned to form a tight seal with the plug seal of the closure 144. Preferably, the sealing surface 212 is to be polished to a degree of smoothness that is commonly associated with a mirror finish. As such, it is contemplated that the sealing surface 212 comprises a mirror polished region along the interior of the finish portion 164. Further, in some embodiments, the bevel 208 may also be conditioned to comprise a mirror polished region at the beginning of the opening 172. Any of various techniques may be used to mirror polish either or both of the sealing surface 212 and the bevel 208, without limitation.

As shown in FIG. 3, the sealing surface 212 extends away from the bevel 208, deeper into the opening 172 to a transition surface 216. The transition surface 216 comprises a region within the interior of the finish portion 164 wherein the interior diameter of the opening 172 generally narrows from the diameter of the sealing surface 212 to a smaller diameter of a handling surface 220. In the embodiment illustrated in FIG. 3, the transition surface 216 comprises a reverse curve surface that includes a concave portion 224 that extends from the sealing surface 212 and joins with a convex portion 228 that extends to the handling surface 220. As will be recognized, the handling surface 220 includes a diameter of the opening 172 that is configured to receive various forms of equipment used to configure the preform 160 into the container 100.

It is contemplated that the transition surface 216 is to be capable of cooperating with the plug seal of the closure 144 to form a tight seal between the closure 144 and the container 100. In some embodiments, the concave portion 224 may be configured to forcibly receive an end of the plug seal so as to form a tight seal therebetween. Further, in some embodiments, the convex portion 228 may be configured to forcibly receive the end of the plug seal. As such, the transition surface 216 may include a smooth surface that is polished similarly to the sealing surface 212. It is envisioned that the transition surface 216 may be mirror polished, as described hereinabove with respect to the sealing surface 212.

Moreover, in some embodiments, the plug seal of the closure 144 may be configured to extend into the opening such that the plug seal cooperates with the handling surface 220 to seal the container 100. In such embodiments, the plug seal may include a sidewall shape that mates with the concave and convex portions 224, 228. As will be appreciated, therefore, the handling surface 220 may be mirror polished similarly to the sealing surface 212 and the transition surface 216. It is contemplated that mirror polished surface may be achieved by way of any of various suitable polishing techniques, such as mechanical machining and buffing, chemical treatments, plasma treatments, and the like, without limitation.

In some embodiments, such as the illustrated embodiment of FIG. 3, a secondary transition surface 244 may be disposed between the handling surface 220 and an interior surface 248 of the body portion 168. In general, the secondary transition surface 244 comprises a region within the interior of the finish portion 164 wherein the interior diameter of the opening 172 narrows from the diameter of the handling surface 220 to a smaller diameter of the interior surface 248. In the embodiment illustrated in FIG. 3, the secondary transition surface 244 comprises a reverse curve surface that includes a concave portion 252 that extends from the handling surface 220 to a convex portion 256 that extends to the interior surface 248.

In some embodiments, the secondary transition surface 244 may be configured to cooperate with the plug seal of the closure 144 to form a tight seal between the closure 144 and the container 100 suitable for storing pressurized contents, such as carbonated beverages, within the container 100. As such, the concave portion 252 may be configured to tightly receive an end of the plug seal to form a tight seal therebetween. In some embodiments, the convex portion 256 may be configured to forcibly receive and compress the end of the plug seal. To this end, the secondary transition surface 244 preferably includes a smooth surface that is polished similarly to the sealing surface 212. It is envisioned that the secondary transition surface 244 may be mirror polished, as described hereinabove with respect to the sealing surface 212.

In some embodiments, the plug seal of the closure 144 may be configured to extend into the opening 172 such that the plug seal extends beyond the secondary transition surface 244 and thus cooperates with the portion of the interior surface 248 near the convex portion 256. In some embodiments, the interior surface 248 may have a diameter that tightly compresses the end of the plug seal to seal the pressurized contents within the container 100. It is contemplated that, in some embodiments, the plug seal may include a sidewall profile that mates with the concave and convex portions 252, 256. As such, the interior surface 248 preferably is mirror polished similarly to the mirror polish of the sealing surface 212. As disclosed hereinabove, the mirror polished surface may be achieved by way of any of various suitable polishing techniques, such as mechanical machining and buffing, chemical treatments, plasma treatments, and the like, without limitation.

In the embodiment illustrated in FIG. 3, the surfaces 212, 220, 248 generally comprise a stepped interior of the finish portion 164. As such, the stepped interior comprises a graduated narrowing of the opening 172 that extends from the bevel 208, through the finish portion 164, to the tamper evidence ledge 176. It is contemplated that the stepped interior comprises multiple sidewall portions of the finish 164 that may be configured to advantageously minimize the quantity of resin comprising the finish portion 164, as compared to finish portions comprising a substantially uniform diameter.

In some embodiments, the stepped interior may be configured to compressibly receive a plug seal of the closure 144 that comprises graduated seals configured to tightly engage with the graduated narrowing of the opening 172. For example, the stepped interior can include one or more sealing surfaces that are each configured to tightly engage with one of the graduated seals of the plug seal to contribute to forming a tight seal between the closure 144 and the container 100. As will be appreciated, therefore, the graduated seals of the plug seal generally include diameters that are suitable for engaging with the graduated narrowing of the opening 172 so as to seal pressurized contents, such as carbonated beverages, within the container 100. It is contemplated that the one or more sealing surfaces comprise mirror-polished surfaces that are joined together by transition surfaces. Further, the transition surfaces are contemplated to comprise mirror-polished surfaces that cooperate with the one or more seals of the plug seal so as to contribute to forming the tight seal between the closure 144 and the container 100.

In the exemplary embodiment shown in FIG. 3, the sealing surface 212 is configured to compressibly receive a first seal comprising the plug seal, and the handling surface 220 is configured to compressibly receive a second seal of the plug seal. Further, the interior surface 248 may be configured to compressibly receive a third seal comprising the plug seal. Accordingly, the sealing surface 212 includes a first diameter configured to tightly compress the first seal of the plug seal, and the handling surface 220 includes a second diameter configured to tightly compress the second seal. The interior surface 248 includes a third diameter configured to tightly compress the third seal of the plug seal. As will be appreciated, the third diameter is equal to or less than the second diameter, and the second diameter is equal to or less than the first diameter. Further, the transition surface 216 comprises a change in diameter of the opening 172 that transitions from the first diameter of the sealing surface 212 to the second diameter of the handling surface 220. The secondary transition surface 244 comprises a change diameter of the opening 172 that transitions from second diameter of the handling surface 220 to the third diameter of the interior surface 248. As disclosed hereinabove, the transition surfaces 216, 244 comprise mirror-polished surfaces that may be formed by way of any of various suitable polishing techniques.

With continuing reference to FIG. 3, the tamper evidence ledge 176 comprises a rounded upper portion 232 and a substantially flat lower portion 236. As will be appreciated, the rounded upper portion 232 facilitates passing the tamper evidence band 148 of the closure 144 over the tamper evidence ledge 176 during assembly of the closure 144 onto the container 100. The flat lower portion 236 is configured to retain the tamper evidence band 148 positioned below the tamper evidence ledge 176 during loosening of the closure 144. For example, when the closure 144 is initially installed onto the container 100 by a manufacturer, the tamper evidence band 148 easily passes over the tamper evidence ledge 176 due to the rounded upper portion 232. When an end-user later loosens the closure 144, the flat lower portion 236 retains the tamper evidence band 148 below the tamper evidence ledge 176, causing the tamper evidence band 148 to break loose from the closure 144. Thus, the flat lower portion 236 of the tamper evidence ledge 176 and the tamper evidence band 148 of the closure 144 cooperate to indicate to the end-user that the closure 144 has not been previously loosened after being installed by the manufacturer. It should be understood, however, that the tamper evidence ledge 176 is not limited to being coupled with tamper evidence bands, as described above, but rather the tamper evidence ledge 176 may be configured to operate with any of various devices for indicating whether or not the container has been previously opened.

Disposed between the tamper evidence ledge 176 and the threads 180 is a handling valley 240 that extends circumferentially around the finish portion 164. The handling valley 240 comprises a portion of the finish portion 164 that has a wall thickness and a diameter that are substantially similar to the wall thickness and diameter of the neck portion 192, below the tamper evidence ledge 176. As such, the handling valley 240 and the neck portion 192 advantageously enable gripping fingers to engage with and support the container 100 during air-conveying the container 100 along a manufacturing assembly. For example, a first pair of gripping fingers can extend into the handling valley 240 to support the container 100 at a first station of a manufacturing line. Then, upon being conveyed to a second station, a second pair of gripping fingers can extend around the neck portion 192, below the tamper evidence ledge 176, while the first pair of gripping fingers are removed from the handling valley 240. Similarly, upon arriving at a third station, a third pair of gripping fingers can engage with the handling valley 240 while the second pair of gripping fingers are removed from the neck portion 192. Thus, the container 100 can be transported along the manufacturing line by alternatingly engaging gripping fingers with the handling valley 240 and the neck portion 192.

As will be appreciated, the handling valley 240 provides a separation between the tamper evidence ledge 176 and the threads 180 suitable for receiving the pair of gripping fingers, as described above. In general, the separation must be large enough to allow the gripping fingers to easily pass between the tamper evidence ledge 176 and the threads 180. As such, any of various separations, greater than the width of the gripping fingers, may be disposed between the tamper evidence ledge 176 and the threads 180, without limitation, and without deviating beyond the scope of the present disclosure.

Figure 4:
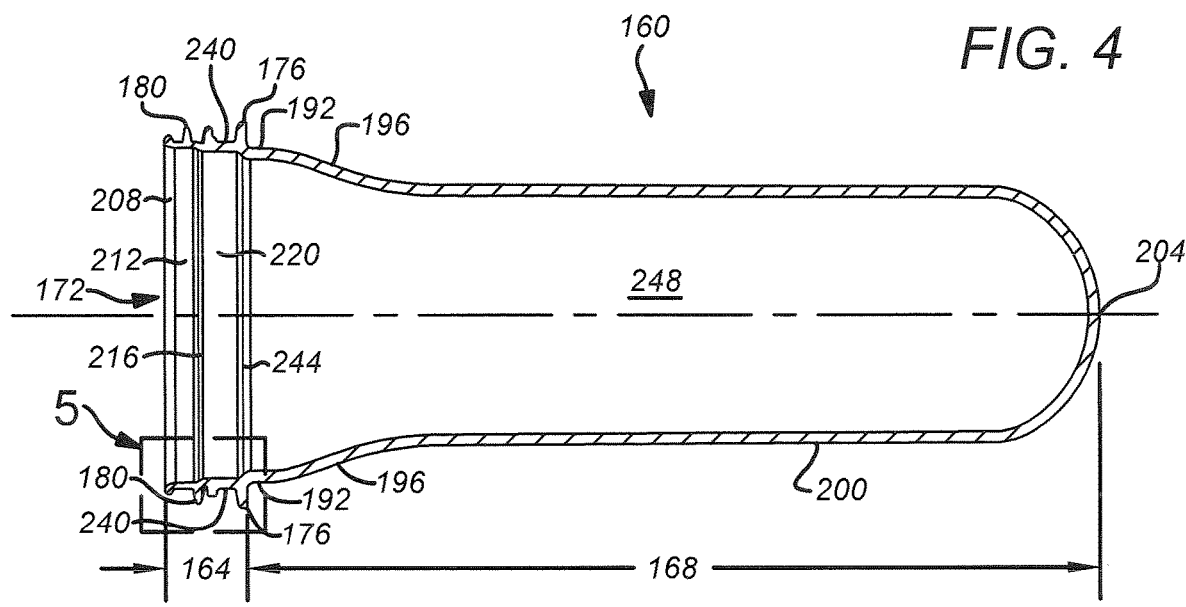
FIG. 4 is a cross-sectional view of another exemplary embodiment of a preform suitable for being blow-molded to form a container in accordance with the present disclosure.
Figure 5:
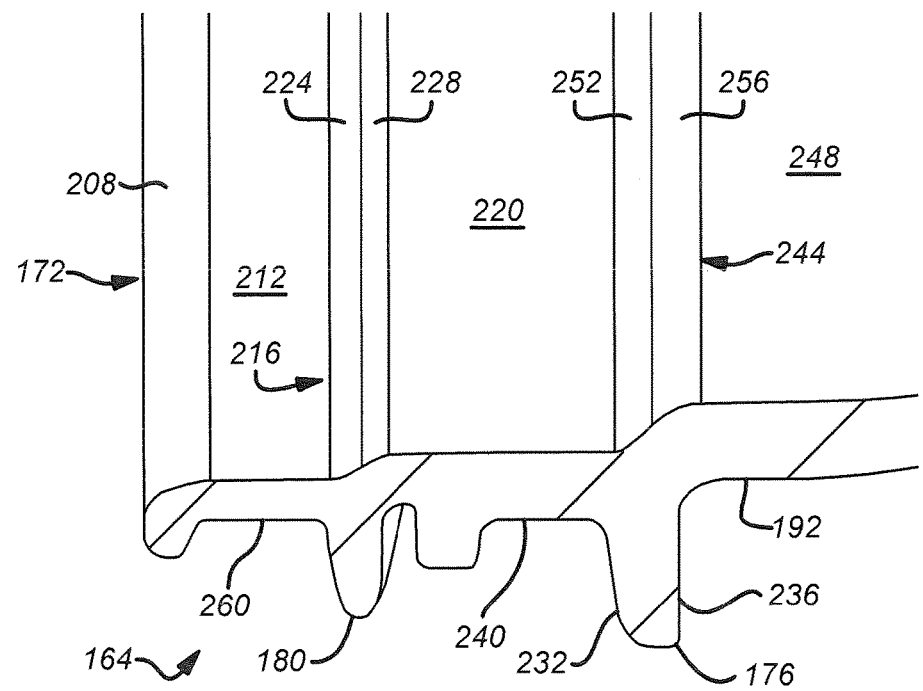
FIG. 5 illustrates a close-up cross-sectional view of a sidewall portion of a finish comprising the preform illustrated in FIG. 4, according to the present disclosure.

FIGS. 4-5 illustrate cross-sectional views of an exemplary embodiment of a preform 160 suitable for being blow-molded to form a plastic bottle, such as the container 100, according to the present disclosure. The preform 160 shown in FIGS. 4-5 is substantially identical to the preform 160 discussed with reference to FIGS. 2-3, with the exception that the preform 160 of FIGS. 4-5 includes a handling valley 240 having a greater diameter than the handling valley 240 of FIGS. 2-3. As best shown in FIG. 5, the handling valley 240 is substantially aligned with a base surface 260 of the threads 180. Thus, the handling valley 240 comprises a diameter of the finish portion 164 that is substantially the same as the diameter of the base surface 260 of the finish portion 164.

Upon comparing FIGS. 3 and 5, it is straightforward to see that the greater diameter of the handling valley 240 shown in FIG. 5 affords a larger diameter handling surface 220 within the finish portion 164. It is contemplated that, in some instances, the larger diameter handling surface 220 of FIG. 5 may advantageously facilitate working with the preform 160 to form the container 100. For example, in some embodiments, the larger diameter handling surface 220 may facilitate engaging a blow-molding nozzle with the secondary transition surface 244 during blowing the preform 160 into a container, thereby limiting potentially damaging forces acting on the finish portion 164.

Figure 6:
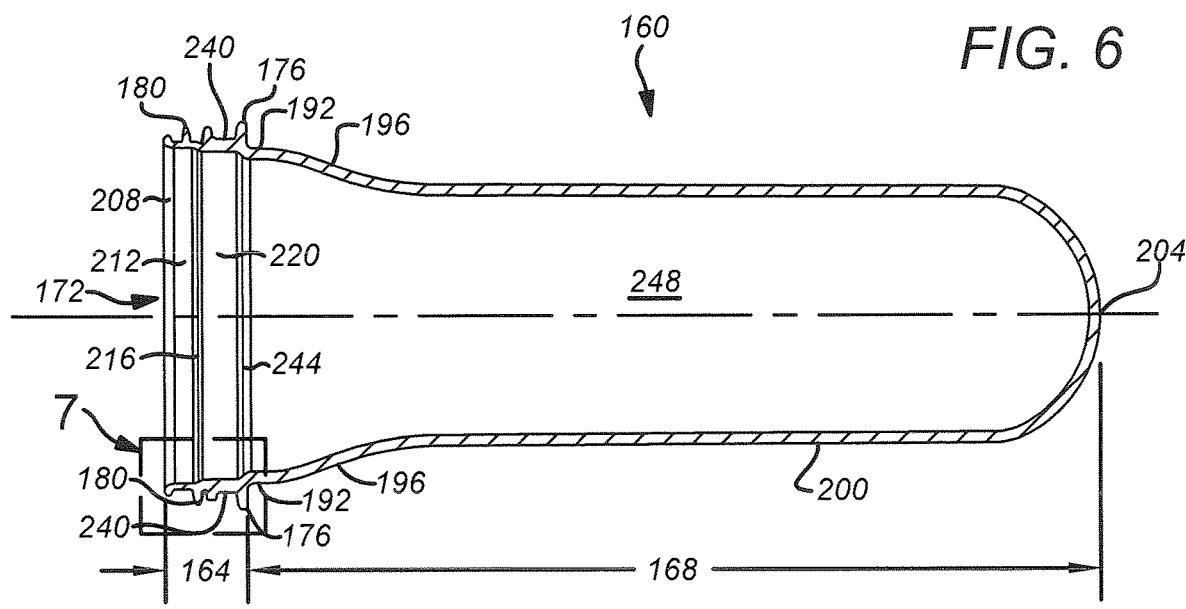
FIG. 6 is a cross-sectional view of another exemplary embodiment of a preform suitable for being blow-molded to form a container in accordance with the present disclosure.
Figure 7:
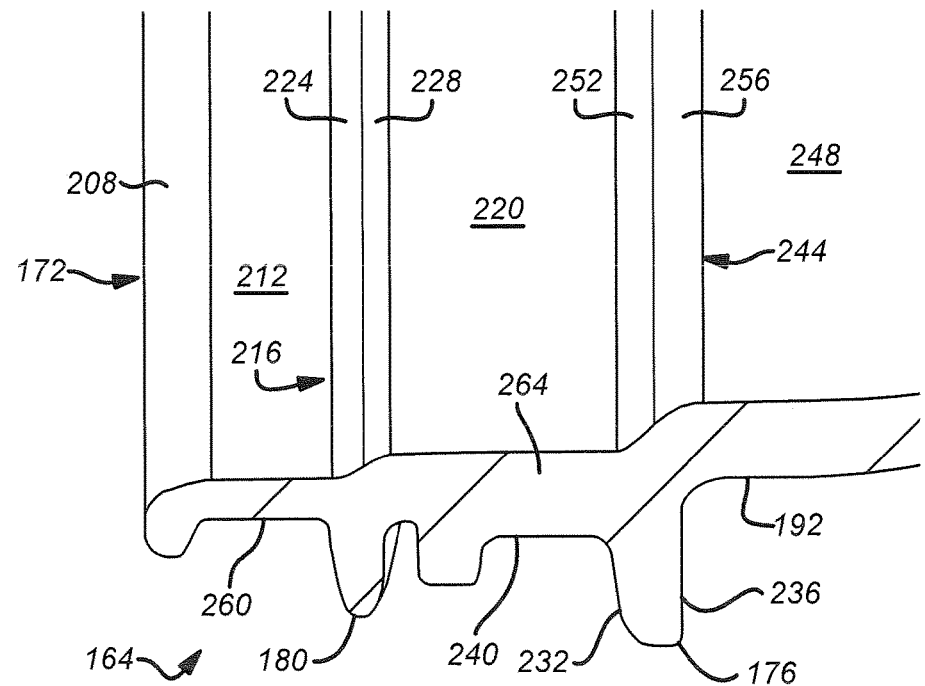
FIG. 7 illustrates a close-up cross-sectional view of a sidewall portion of a finish comprising the preform illustrated in FIG. 6, according to the present disclosure.

It should be borne in mind that the handling valley 240 may be formed with any desirable diameter, without limitation. For example, FIGS. 6-7 illustrate an exemplary embodiment of a preform 160 that includes a handling valley 240 having a diameter that is larger than the diameter of a base surface 260 of the threads 180. With the exception of the handling valley 240, the preform 160 shown in FIGS. 6-7 is substantially identical to the preform 160 of FIGS. 4-5. As such, the finish portion 164 of FIGS. 6-7 may include a relatively thick sidewall 264 surrounding the handling surface 220.

It is contemplated that the thick sidewall 264 may be configured, in some embodiments, to contribute to a greater structural integrity of the finish portion 164. In some embodiments, however, the sidewall 264 may be thinned and the curvature of the transition surface 216 may be reduced to provide clearance for the passage of instruments through the interior of the finish portion 164. For example, in some embodiments, the larger diameter handling valley 240 and the thinned sidewall 264 may facilitate engaging a blow-molding nozzle with the secondary transition surface 244 during blowing the preform 160 into a container, thereby limiting potentially damaging forces acting on the finish portion 164.

The articles described herein may be made from any suitable thermoplastic material, such as polyesters including polyethylene terephthalate (PET), polyolefins, including polypropylene and polyethylene, polycarbonate, polyamides, including nylons (e.g. Nylon 6, Nylon 66, MXD6), polystyrenes, epoxies, acrylics, copolymers, blends, grafted polymers, and/or modified polymers (monomers or portion thereof having another group as a side group, e.g. olefin-modified polyesters). These materials may be used alone or in conjunction with each other. More specific material examples include, but are not limited to, ethylene vinyl alcohol copolymer ("EVOH"), ethylene vinyl acetate ("EVA"), ethylene acrylic acid ("EAA"), linear low density polyethylene ("LLDPE"), polyethylene 2,6- and 1,5-naphthalate (PEN), polyethylene terephthalate glycol (PETG), poly(cyclohexylenedimethylene terephthalate), polystryrene, cycloolefin, copolymer, poly-4-methylpentene-1, poly(methyl methacrylate), acrylonitrile, polyvinyl chloride, polyvinylidine chloride, styrene acrylonitrile, acrylonitrile-butadiene-styrene, polyacetal, polybutylene terephthalate, ionomer, polysulfone, polytetra-fluoroethylene, polytetramethylene 1,2-dioxybenzoate and copolymers of ethylene terephthalate and ethylene isophthalate. In certain embodiments preferred materials may be virgin, pre-consumer, post-consumer, regrind, recycled, and/or combinations thereof.

In some embodiments, polypropylene also refers to clarified polypropylene. As used herein, the term "clarified polypropylene" is a broad term and is used in accordance with its ordinary meaning and may include, without limitation, a polypropylene that includes nucleation inhibitors and/or clarifying additives. Clarified polypropylene is a generally transparent material as compared to the homopolymer or block copolymer of polypropylene. The inclusion of nucleation inhibitors helps prevent and/or reduce crystallinity, which contributes to the haziness of polypropylene, within the polypropylene. Alternatively, nucleation inhibitors may be added to polypropylene.

As used herein, "PET" includes, but is not limited to, modified PET as well as PET blended with other materials. One example of a modified PET is IP A-modified PET, which refers to PET in which the IP A content is preferably more than about 2% by weight, including about 2-10% IP A by weight, also including about 5-10% IP A by weight. In another modified PET, an additional comonomer, cylohexane dimethanol (CHDM) is added in significant amounts (e.g. approximately 40% by weight or more) to the PET mixture during manufacture of the resin.

Additives may be included in articles herein to provide functional properties to the resulting containers. Such additives include those providing enhanced gas barrier, UV protection, scuff resistance, impact resistance and/or chemical resistance. Preferred additives may be prepared by methods known to those of skill in the art. For example, the additives may be mixed directly with a particular material, or they may be dissolved/dispersed separately and then added to a particular material. Additives may be present in an amount up to about 40% of the material, also including up to about 30%, 20%, 10%, 5%, 2% and 1% by weight of the material. In some embodiments, additives may be present in an amount less than or equal to 1% by weight, such ranges of materials including, but not limited to, about 0.01% to about 1%, about 0.01% to about 0.1%, and about 0.1% to about 1% by weight.

Another possible additive is microparticulate clay or graphene-based materials. These materials comprise tiny, micron or sub-micron size (diameter), particles of materials which enhance the barrier and/or mechanical properties of a material by creating a more tortuous path for migrating gas molecules, such as oxygen or carbon dioxide, to take as they permeate a material and/or providing added stiffness. In some embodiments, nanoparticulate material is present in amounts ranging from 0.05 to 1% by weight, including 0.1%, 0.5% by weight and ranges encompassing these amounts. In some embodiments, nanoparticles comprise monmorillonite that may be modified with a ternary or quaternary ammonium salt. In some embodiments, such particles comprise organoclays as described in U.S. Pat. No. 5,780,376, the entire disclosure of which is hereby incorporated by reference and forms part of the disclosure of this application. Other suitable organic and inorganic microparticulate clay based or nano-sized products may also be used. Both man-made and natural products are also suitable.

In some embodiments, the UV protection properties of the material may be enhanced by the addition of one or more additives. In one embodiment, the UV protection material used provides UV protection up to about 350 nm or less, preferably about 370 nm or less, more preferably about 400 nm or less. The UV protection material may be used as an additive with layers providing additional functionality or applied separately as a single layer. In some embodiments, additives providing enhanced UV protection are present in the material from about 0.05 to 20% by weight, but also including about 0.1%, 0.5%, 1%, 2%, 3%, 5%, 10%, and 15% by weight, and ranges encompassing these amounts. In some embodiments, the UV protection material is added in a form that is compatible with the other materials. In some embodiments, a preferred UV protection material comprises a polymer grafted or modified with a UV absorber that is added as a concentrate. Other preferred UV protection materials include, but are not limited to, benzotriazoles, phenothiazines, and azaphenothiazines. UV protection materials may be added during the melt phase process prior to use, such as prior to injection molding or extrusion.

While the invention has been described in terms of particular variations and illustrative figures, those of ordinary skill in the art will recognize that the invention is not limited to the variations or figures described. In addition, where methods and steps described above indicate certain events occurring in certain order, those of ordinary skill in the art will recognize that the ordering of certain steps may be modified and that such modifications are in accordance with the variations of the invention. Additionally, certain of the steps may be performed concurrently in a parallel process when possible, as well as performed sequentially as described above. To the extent there are variations of the invention, which are within the spirit of the disclosure or equivalent to the inventions found in the claims, it is the intent that this patent will cover those variations as well. Therefore, the present disclosure is to be understood as not limited by the specific embodiments described herein, but only by scope of the appended claims.

What is claimed is:

1. A finish portion of a preform for rotatably engaging with a closure to seal pressurized contents within an interior of a container formed from the preform, the finish portion comprising:
    a cylindrical body that begins at an opening to the interior and extends to and includes a tamper evidence ledge, the cylindrical body coupled to a body portion of the preform by a tapered portion;
    a bevel disposed at the opening and configured to receive a plug seal of the closure; and
    a stepped interior comprising a graduated narrowing of the cylindrical body extending from the bevel to the tamper evidence ledge.

2. The finish portion of claim 1, wherein the stepped interior is configured to compressibly receive a plug seal comprising graduated seals configured to engage with the graduated narrowing.

3. The finish portion of claim 2, wherein the graduated seals include one or more diameters suitable for engaging with the graduated narrowing of the opening so as to seal pressurized contents within the container.

4. The finish portion of claim 1, wherein the stepped interior includes one or more sealing surfaces configured to engage with one or more seals comprising the plug seal to form a seal between the closure and the container, and wherein one or more sealing surfaces each comprise a mirror-polished surface.

5. The finish portion of claim 4, wherein adjacent of the one or more sealing surfaces are joined by a transition surface comprising a mirror-polished surface configured to cooperate with the one or more seals of the plug seal so as to contribute to forming the seal between the closure and the container.

6. The finish portion of claim 1, wherein the stepped interior includes a sealing surface adjacent to the bevel and configured to cooperate with the plug seal to seal the contents with the container, wherein the stepped interior includes a first transition surface extending from the sealing surface to a handling surface positioned between the bevel and the tamper evidence ledge and a second transition surface extending from the handling surface to an interior surface of the preform.

7. The finish portion of claim 6, wherein the plug seal includes a first seal configured to be compressibly received by the sealing surface, a second seal configured to be compressibly received by the handling surface, and a third seal configured to be compressibly received by the interior surface.

8. The finish portion of claim 6, wherein the sealing surface includes a first diameter configured to compress a first seal of the plug seal, and wherein the handling surface includes a second diameter configured to compress a second seal of the plug seal, the second diameter being equal to or less than the first diameter.

9. The finish portion of claim 8, wherein the interior surface includes a third diameter configured to compress a third seal of the plug seal, the third diameter being equal to or less than the second diameter.

10. The finish portion of claim 6, wherein the stepped interior comprises a reverse curve surface that includes a concave portion that extends from the sealing surface and joins with a convex portion that extends to the handling surface.

11. A finish portion of a preform for rotatably engaging with a closure to seal pressurized contents within an interior of a container formed from the preform, the finish portion comprising:

a cylindrical body that begins at an opening to the interior and extends to and includes a tamper evidence ledge, the cylindrical body defining a stepped interior surface including
    a sealing surface adjacent to the opening for cooperating with a plug seal of the closure to seal the contents with the container;
    a first transition surface extending from the sealing surface to a handling surface positioned between the sealing surface and the tamper evidence ledge, the handling surface configured to receive equipment to form the preform into the container; and
    a second transition surface extending from the handling surface to an interior surface of the preform.

12. The finish portion of claim 11, wherein the sealing surface comprises a mirror-polished surface disposed along the interior of the finish portion for cooperating with the plug seal to retain contents within the container.

13. The finish portion of claim 11, wherein the first transition surface comprises a mirror-polished surface configured to cooperate with the plug seal to form a seal between the closure and the container.

14. The finish portion of claim 11, wherein the handling surface includes a mirror-polished surface similar to either or both of the sealing surface and the first transition surface.

15. The finish portion of claim 11, wherein the second transition surface comprises a narrowing of an interior diameter of the handling surface to a smaller diameter of the interior surface, wherein the second transition surface comprises a mirror-polished surface to cooperate with the plug seal of the closure to form a seal suitable for storing pressurized contents.

16. The finish portion of claim 11, wherein the interior surface comprises a mirror-polished surface having a diameter adapted to compress an end of the plug seal to seal pressurized contents within the container.

17. The finish portion of claim 11, wherein the transition surface comprises a reverse curve surface that includes a concave portion that extends from the sealing surface and joins with a convex portion that extends to the handling surface.

18. The finish portion of claim 11, wherein the second transition surface comprises a reverse curve surface that includes a concave portion that extends from the handling surface to a convex portion that extends to the interior surface.

19. The finish portion of claim 18, wherein the concave portion is configured to receive an end of the plug seal to form a seal therebetween.

20. The finish portion of claim 18, wherein the convex portion is configured to forcibly receive and compress the end of the plug seal.

21. The finish portion of claim 11, further comprising a bevel disposed at the opening and configured to receive a plug seal of the closure, and wherein the first transition surface is positioned between the bevel and the tamper evidence ledge.

22. A finish portion of a preform for rotatably engaging with a closure to seal pressurized contents within an interior of a container formed from the preform, the finish portion comprising:
    a cylindrical body that begins at an opening to the interior and extends to and includes a tamper evidence ledge;
    a bevel disposed at the opening and configured to receive a plug seal of the closure; and
    a stepped interior comprising a graduated narrowing extending from the opening through the cylindrical body,
    wherein the stepped interior is configured to compressibly receive a plug seal comprising graduated seals configured to engage with the graduated narrowing,
    wherein the graduated seals include one or more diameters suitable for engaging with the graduated narrowing of the opening so as to seal pressurized contents within the container.

\* \* \* \* \*